(12) United States Patent
Lee et al.

(10) Patent No.: US 6,523,959 B2
(45) Date of Patent: Feb. 25, 2003

(54) COOLING DEVICE FOR LIQUID CRYSTAL PROJECTORS

(75) Inventors: Wen-Tsung Lee, Taipei (TW); Yuan-Jen Chang, Taipei (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 10/014,437

(22) Filed: Dec. 14, 2001

(65) Prior Publication Data

US 2002/0135741 A1 Sep. 26, 2002

(30) Foreign Application Priority Data

Mar. 22, 2001 (TW) ........................................ 90106674 A

(51) Int. Cl.[7] .............................................. G03B 21/14
(52) U.S. Cl. .......................................... 353/52; 353/61
(58) Field of Search .............................. 353/52, 54, 61, 353/57, 60; 349/161

(56) References Cited

U.S. PATENT DOCUMENTS 4,772,098 A  9/1988  Ogawa
5,170,195 A  12/1992  Akiyama et al.
5,282,121 A  * 1/1994  Bornhorst et al. ............ 353/54
5,493,351 A  * 2/1996  Hamagishi et al. ............ 349/5
5,767,924 A  6/1998  Hiroki et al.
5,803,566 A  * 9/1998  Ogino ........................ 353/52

* cited by examiner

Primary Examiner—William Dowling
(74) Attorney, Agent, or Firm—Birch, Stewart, Kolasch & Birch, LLP

(57) ABSTRACT

A cooling device of liquid crystal projector is utilized to cool a liquid crystal panel and polarizer of an optical system in a liquid crystal projector; when the optical system of the present invention is heated by a light projection, coolant will carry the heat of the liquid crystal panel and polarizer of the optical system away, and a flow guiding device is used to lead the coolant to flow so as to cool the high temperature coolant by means of a heat dissipating device, then the heat is dissipated to outside environment thereby. After the temperature of the coolant is lowered, it is led to flow through the liquid crystal panel and polarizer again by means of the flow-guiding device, so as to repeat a cooling cycle.

17 Claims, 6 Drawing Sheets

COOLING DEVICE FOR LIQUID CRYSTAL PROJECTORS

FIELD OF THE INVENTION

The present invention relates to a cooling device for liquid crystal projectors, and more particularly to an optical system utilized to cool a liquid crystal projector.

RELATED ART

The liquid crystal projector is one product presently being actively developed. The structure of the penetration type liquid crystal projector is shown in FIG. 1. White light (consisting of red, green and blue light) first passes through LA (lens array A), then is bended at MR1 (Mirror 1; first reflecting mirror), then it passes through LB, a polarizer (PSC) and a condenser lens (CD1). DM1 (first dichroic mirror) will let blue light penetrate through it, while reflecting green and red light. At that time, the blue light will bend at MR2, pass through a linear polarizer, and be modulated through a blue-light LCD panel. After passing through a light-examining polarizer, it enters into the first face of a cross dichroic prism (XP). When the green and red light passes through DM2, DM2 will reflect the green light and cause it to pass through a linear polarizer and enter a green-light LCD panel (LCg) to be modulated. It then passes through a light examining polarizer, and enters the second face of the cross dichroic prism (XP). The red light penetrates DM2, MR3 and MR4, then passes through the linear polarizer and enters a red-light LCD (LCr) to be modulated. After passing through the light-examining polarizer, it enters the third face of the cross dichroic prism (XP). After the three colors of light have entered the cross dichroic prism to be synthesized, the synthesized light passes through the fourth face of the cross dichroic prism and enters the projection lens (PL), so as to project the image on to a screen (S).

Generally speaking, in the LC projector, because light is emitted by gas discharge, the high-temperature light being emitted is collected and projected onto the LC panel to cover the light-examining polarizer of the cross dichroic prism, causing the temperature of the LC panel and light-examining polarizer to increase. So, when the LC projector is being operated, the LC panel and light-examining polarizer must be cooled properly in order to allow the LC panel be able to show clear images on the screen, and not to lose the function of light modulation. Meanwhile, the light-examining polarizer is not to be burned down. The cooling devices currently in effect are air-cooling and fluid cooling.

1. Air cooling: three cooling holes, which correspond to the three LC panels respectively, are opened on the base plate, upon which the cross dichroic prism is fixed, and a cooling fan is installed below the base plate. The air current generated from the cooling fan is directed to the illumination area of the LC panels, to increase the temperature of the air current after it flows past the LC panels, removing the heat of the LC panels. However, such a cooling method cannot increase cooling efficiency if the speed of the air current is increased after it has reached a critical value. Moreover, at the present stage of development, the illumination of the projector is being largely increased while the dimensions of the panel are being decreased, thus causing cooling tunnels and cooling areas to become decreased. Therefore, the cooling requirements of the LC panels are already beyond of the limits of air-cooling.

2. Fluid cooling: the following fluid cooling manner is developed on account that the air cooling has its own limit: the fluid cooling manner, as disclosed in U.S. Pat. No. 4,772,098, is to add a penetration type cooling container and heating tubing device, penetration type coolant is received in the inner part of the penetration type cooling container, and the one surface of the outer part is stuck to one surface of the LC panel, also, the heating tubing device has an absorber inserted in the penetration, type cooling container and a radiator installed at the outer part of the penetration type cooling container utilized to carry away the heat absorbed by the absorber so that the temperature of the LC panel can be lowered. But only one face of the LC panel is installed on the penetration typecooling container in this patent so that the heat at another face of the LC panel cannot be carried away. Furthermore, LC projector become smaller and smaller at the present time, the device provided in this patent is gradually unable to dissipate the heat fast and effectively; and also unable to cool the light-examining polarizer properly.

U.S. Pat. No. 5,170,195 discloses a fluid-cooling manner, which is to add a shielded container, convection strengthening device and cooling fins in a LC projector. The shielded container can let light penetrate and coolant is filled therein, a light examining polarizer and LC panel are disposed at the front and rear walls of the shielded container respectively, and the convection strengthening device is to utilize fluid to carry the heat of the light examining polarizer and LC panel away to the surroundings of the container, then utilize cooling fins disposed around the surroundings of the container to carry the heat of fluid away from the container so as to lower the temperature of the light examining polarizer and LC panel. But, the container disclosed in this patent is only positioned at one side of the light examining polarizer and LC panel, therefore, it is no way to carry the heat away from another side of the light examining polarizer and LC panel. At the present that LC projector is miniaturized, this patent still has no fast and effective way to dissipate the heat.

Again, U.S. Pat. No. 5,767,924 discloses another fluid-cooling manner, which is to add a container, which coolant is stored therein, in the LC projector, and to immerse the LC panel in the way of the light path into the inner part of the container so as to lower the temperature of the LC panel. But, because the temperature of LC panel is lowered only by increasing the temperature of the coolant, and without any other elements to carry away the increased heat of the coolant, therefore, this patent has no effective way lowering the temperature of the LC panel like the above-mentioned patents.

SUMMARY OF THE INVENTION

The main object of the present invention is to provide a cooling device, utilized to cool a LC panel and polarizer of an optical system effectively.

According to the cooling of the LC projector disclosed by the present invention, it comprised a optical system, flow guiding system, heat dissipation system and container, and mainly locates the optical system, current guiding system and heat dissipation system in the container that is full of transmitting coolant. When the optical system is exposed to the light and heated, the coolant will carry the heat of the optical system away, and the flow guiding system is utilized to guide the coolant to flow in order to lead low temperature fluid to the optical system and the high temperature fluid to the heat dissipation system to be cooled, and then the heat absorbed by fluid is dissipated out of the container through the heat dissipation system.

DETAILED DESCRIPTION OF THE INVENTION

Figure 1:
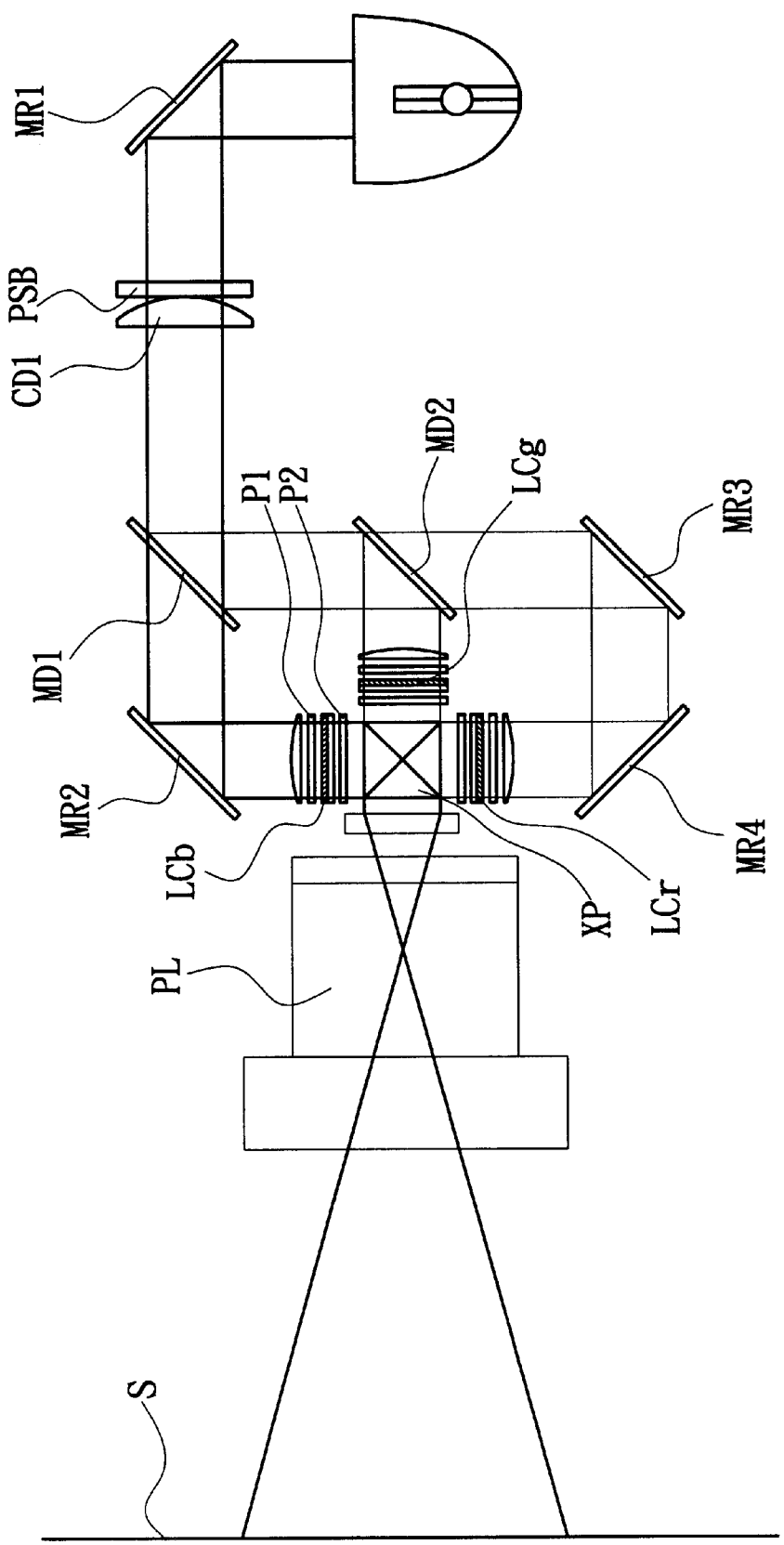
FIG. 1 is a diagram of the present invention, showing the structure of a liquid crystal projector.
Figure 2:
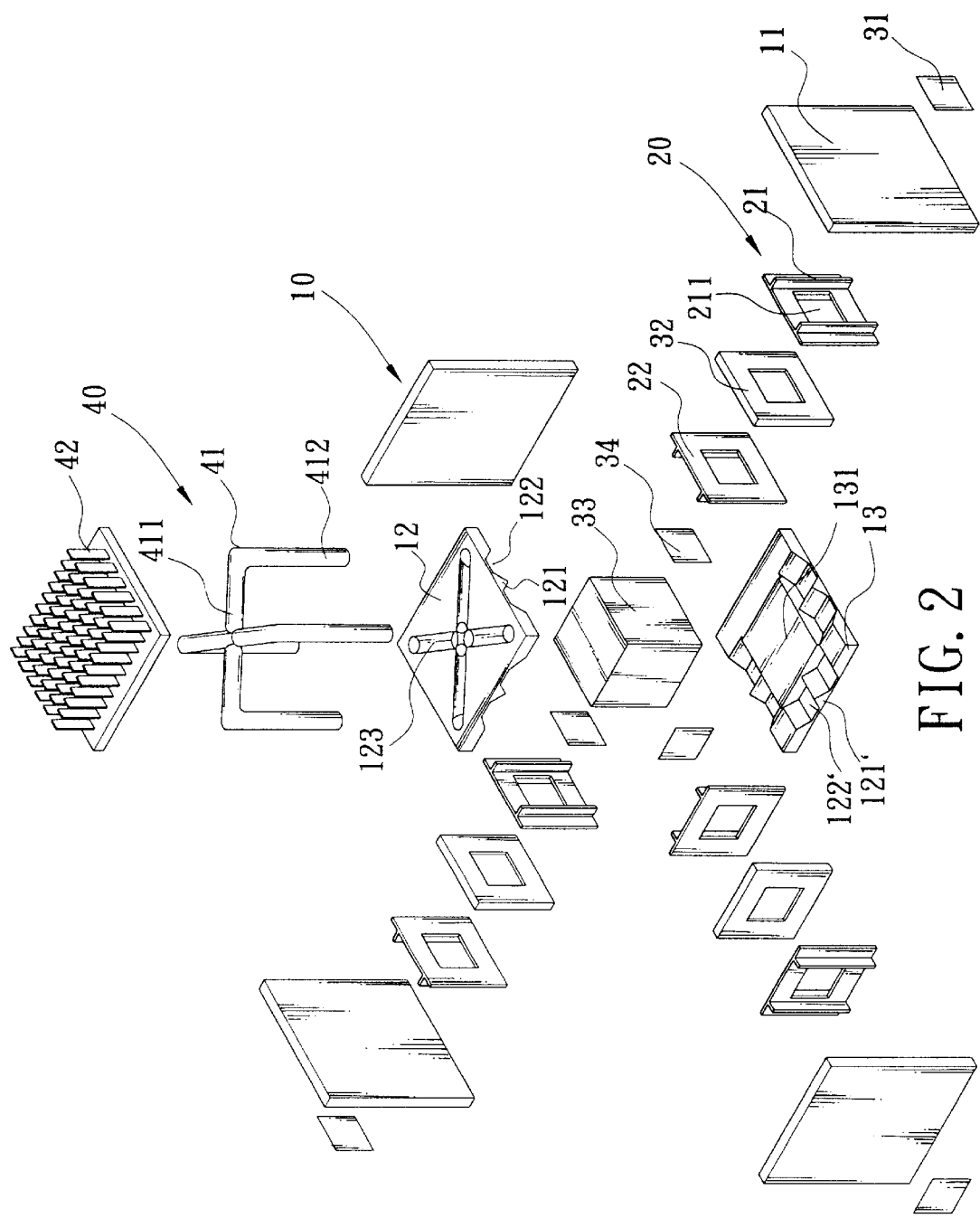
FIG. 2 is an explosive view of a preferred embodiment of the present invention.
Figure 3:
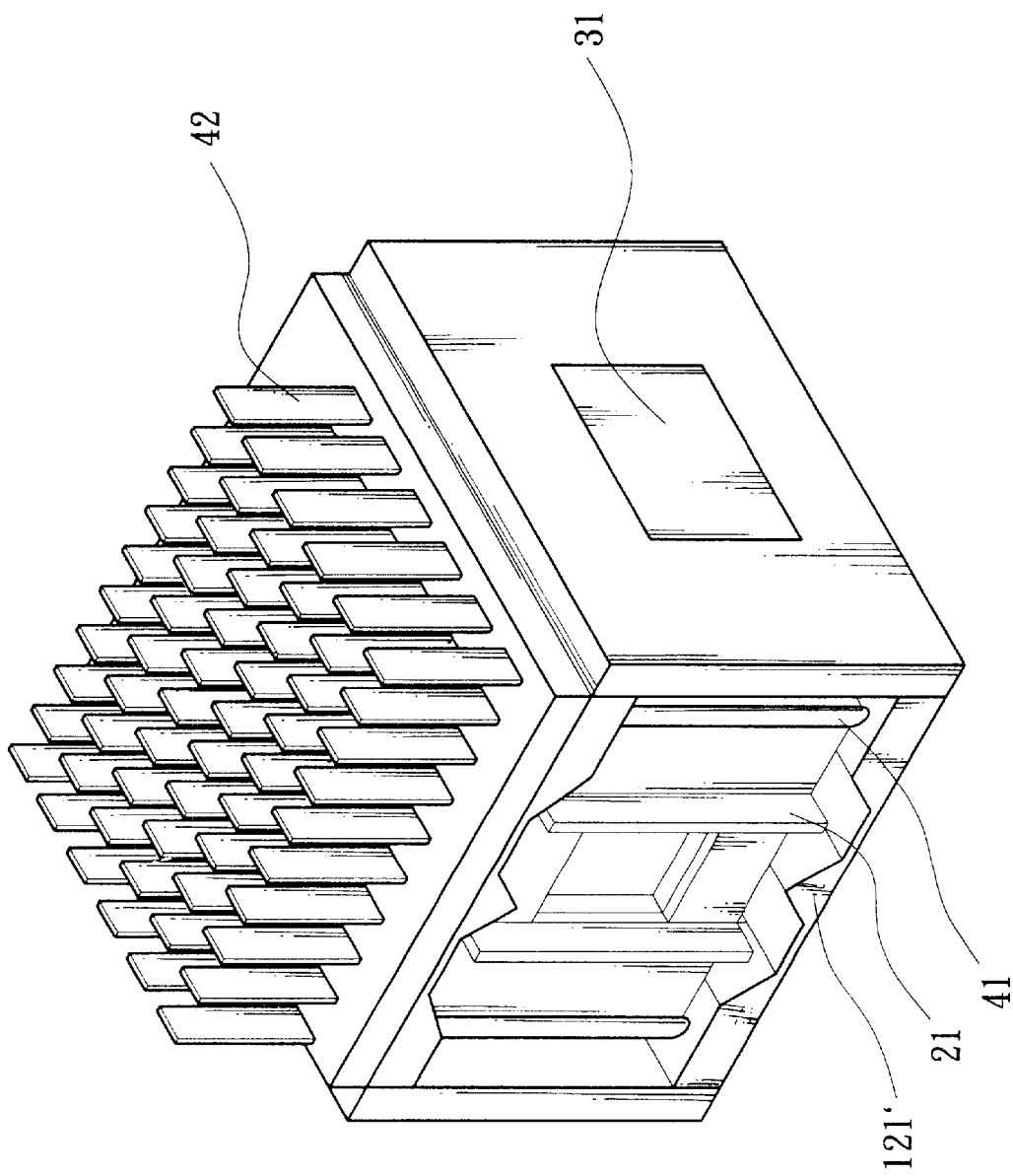
FIG. 3 is a prospective view of a preferred embodiment of the present invention.

The cooling device of the liquid crystal projector according to the present invention is utilized to carry away the heat of the optical device; it includes a container 10, a diversion system 20, an optical system 30 and heat dissipation 40, as FIG. 2 and 3 shown.

The container 10, which is filled with transmitting coolant, comprises a transparent wall 11, upper wall 12 and lower wall 13. The transparent wall face 11 consists of the four flank face of the container, the upper and lower walls 12 and 13 are the upper and lower walls of the container 10, and the upper wall 12 has the protruding parts 121 at the inner wall, grooves 122 at the flank sides of the protruding parts 121 and grooves 123 at the outer wall face. The lower wall 13 has a platform 131 at center of the inner wall face, protruding parts 121' corresponding to the protruding parts 121 of the upper wall and grooves 122' corresponding to the grooves 122 of the upper wall 12.

The flow guiding system 20 consists of an inlet flow guiding plate 21 and exit flow guiding plate 22. The two flow-guiding plates 21 and 22 force the coolant to pass through a flow route formed by the flow guiding plates. The flow guiding plates 21 and 22 has a transmitting zone 211 respectively to let light pass, and two flow guiding plates 21 and 22 form a pair and are disposed at any three flank sides inside the container 10.

The optical system 30 comprises a linear polarization polarizer 31, a LC panel 32, a light synthesizer prism 33 and a light examining polarizer 34. The linear polarization polarizer is attached to the transparent wall 11 of the container 10 corresponding to the position at transmitting zone 21 1 of the flow guiding plates 21 and 22, and the LC panel 32, light synthesizer prism 33 and light examining polarizer 34 are all positioned in the container 10. The LC panel 32 is disposed between the transmitting zones 211 of the pairing flow guiding plates 21 and 22, and the inlet flow guiding plate 21 blocks the two side faces between the inlet face of the LC panel 32 and the transparent wall 11 of the container 10 to construct a closed tunnel. The light synthesizer prism 33 is installed at the platform 131 at the lower wall 13 of the container 10. The light examining polarizer 34 is attached on the light synthesizer prism 33, and corresponding to the transmitting zone 211 of the exit flow guiding plate 22.

The heat dissipation system 40 comprises heat pipes 41 and heat radiating fins 42. Pure water or alcohol is filled in the heat pipes 41; utilizing he phase change of the fluid inside it carries the heat away. Its one end is a heat-absorbing unit 412 disposed in the container 10, another end is a heat-dissipating unit 411 disposed in the groove 123 of the upper wall 12. Each of the four corners of the container 10 has the heat-absorbing unit 412 of the heat tube 41. The heat-dissipating unit 411 is installed at the outer wall face of the upper wall 12, and the heat radiating fins 42 are disposed at the outer wall face of the upper wall 12 and connected with the heat-dissipating unit 411 of the heat pipes.

After the light route leads red, blue and green color lights respectively into the linear polarization polarizers 31 at the three flank sides of the container 10, the light passed through the transmitting zone 211 of the inlet flow guiding plate 21, the LC panel 32, the transmitting zone 211 of the exit flow guiding plate 22 and the light examining polarizer 34 via the transparent wall 11 of the container 10, then three color lights are synthesized through the light synthesizer prism 33. The synthesized light emits from the flank side of the light synthesizer that is installed without a light examining polarizer, and enters lens to project the synthesized image onto screen.

Figure 4:
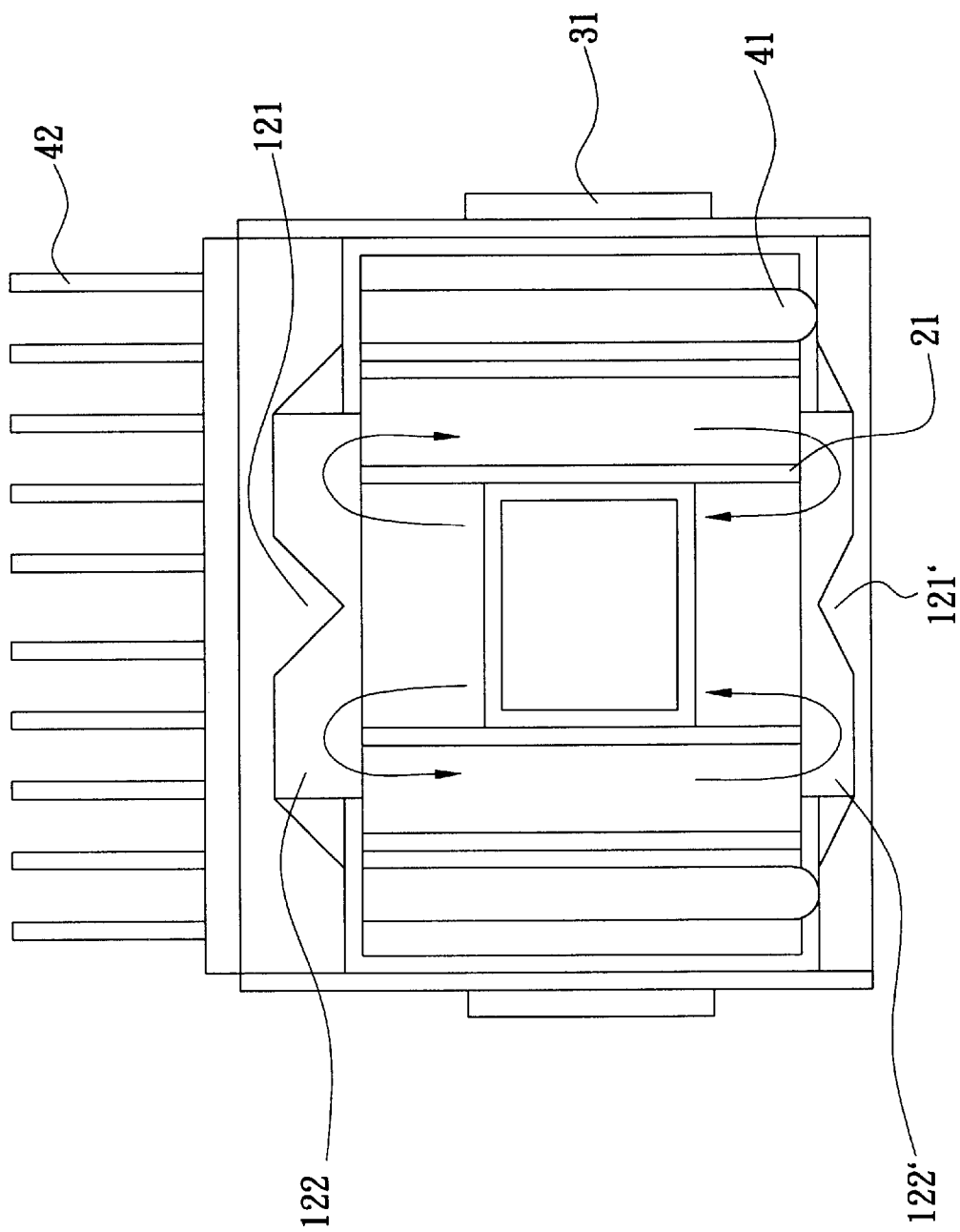
FIG. 4 is a diagram of a preferred embodiment of the present invention, showing the flowing of coolant.

As shown in FIG. 4, when three color lights are passing through the LC panel 32, the light examining polarizer 34 and light synthesizer prism 33, the LC panel 32 and light examining polarizer 34 absorb part of light and the temperature is raised. Because the coolant will carry the heat of these parts away, so the coolant will generate a natural convection, enabling the coolant with high temperature to flow upwards, and separate the coolant through the protruding part 121 and flows along the groove 122 of the upper wall 12, and the heat carried by the coolant will be absorbed by means of the heat absorbing unit 412 of the heat pipe 41 so as to lower the temperature of the coolant, and at that time, the coolant will flow downwards due to the gravity of itself. Therefore, the coolant flows through the groove 122' and is led by the protruding part 121' to flow together through the LC panel 32 and in the tunnel of the light examining polarizer 34, and so a cooling cycle is completed. After the heat absorbs the heat of the coolant absorbing unit 412 of the heat pipe 41, the heat is transferred to the heat-dissipating unit 411 speedily, and then is conducted to the heat radiating fins 42 to dissipate the heat outside the container 10.

Figure 5:
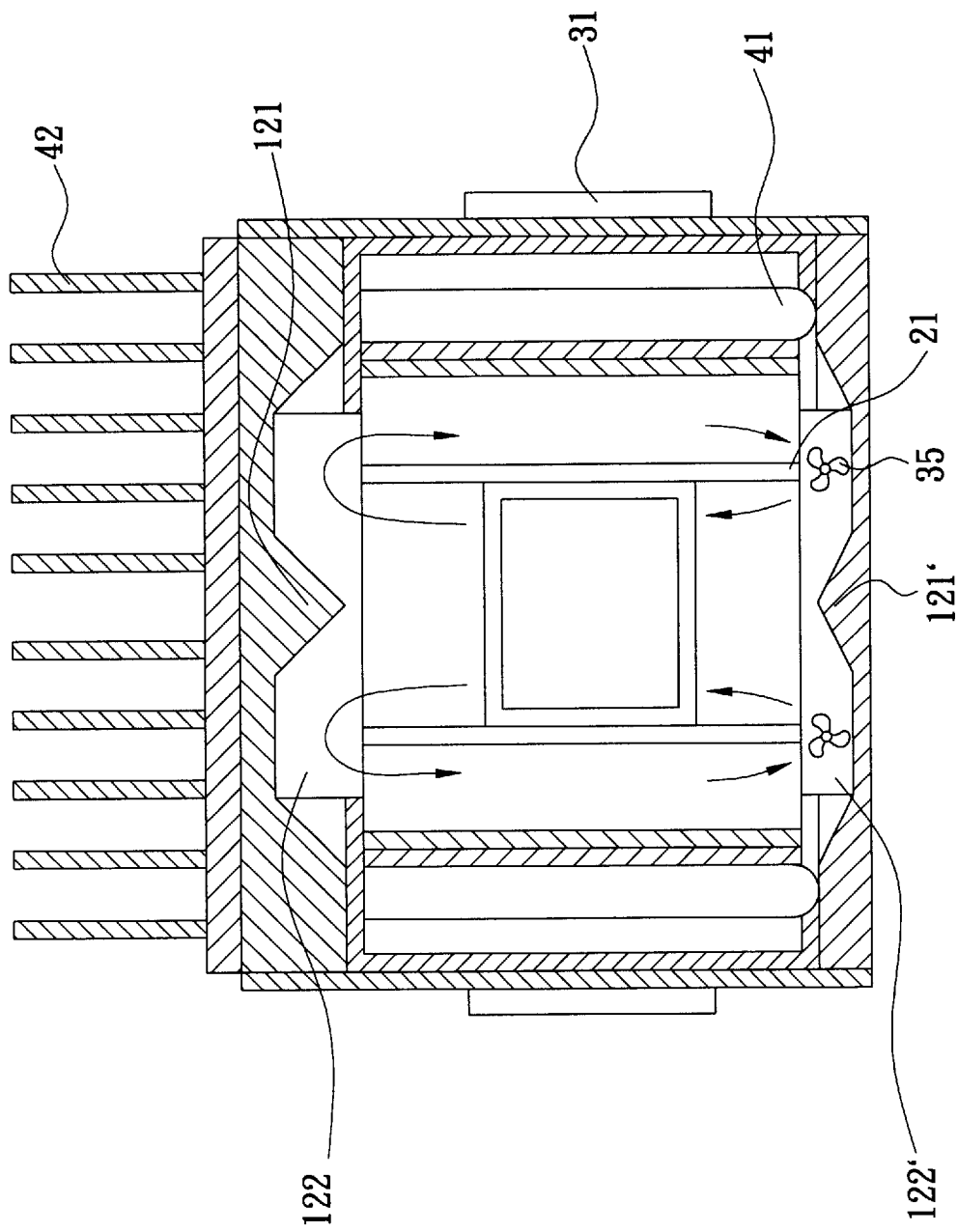
FIG. 5 is a diagram of another preferred embodiment of the present invention, showing the flowing of coolant.

As FIG. 5 shown, the second preferred embodiment of the present invention is to add a stirrer 35 at the groove 122' in the tunnel so as to speed up the flow of the coolant to let the heat be carried away quickly by the coolant.

Figure 6:
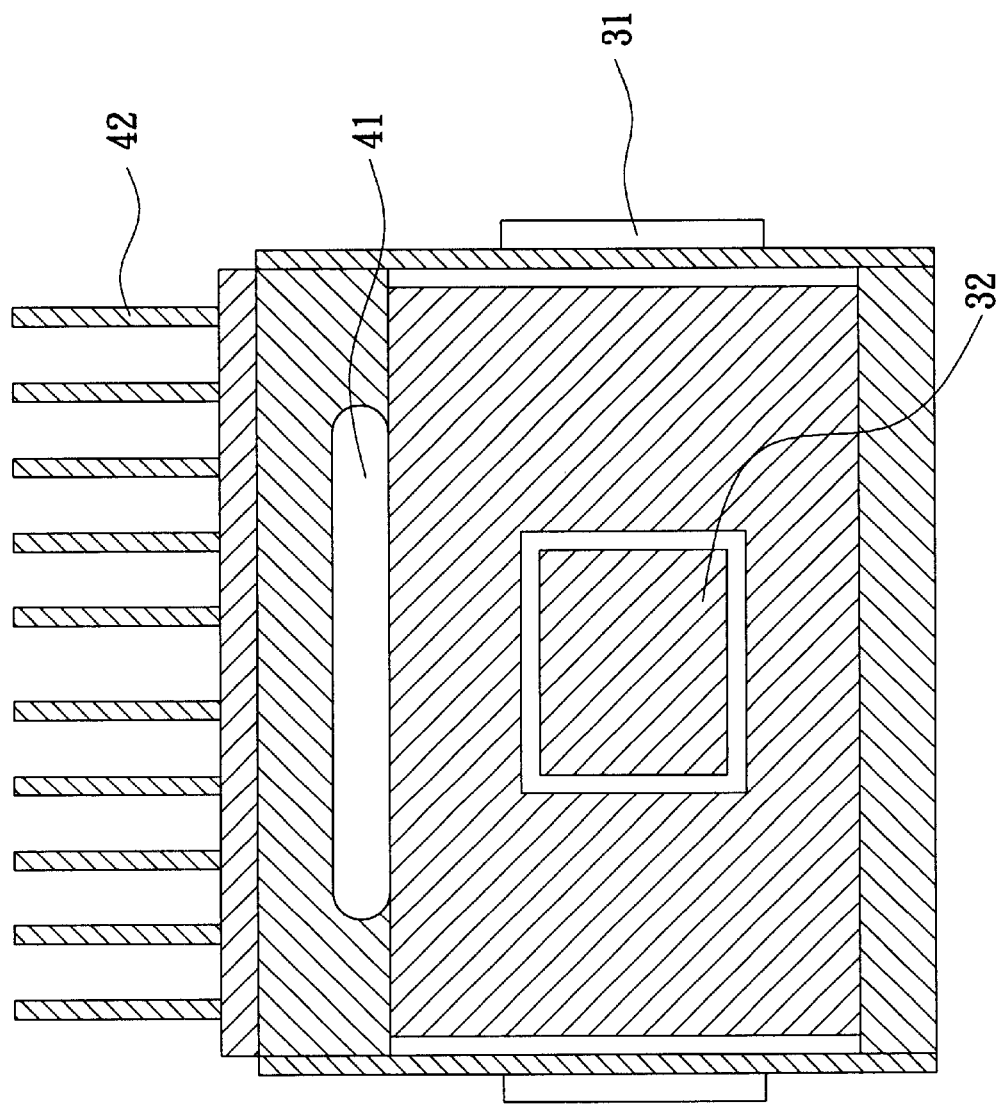
FIG. 6 is a diagram of still another preferred embodiment of the present invention, showing the flowing of coolant.

Please refer to FIG. 6,the third preferred embodiment of the present comprises a container, an optical system 30 and heat dissipation system 40.

The container 10, which is filled with transmitting coolant, comprised a transparent wall 11, upper wall 12 and lower wall 13, the transparent wall face 11 consist of the four flank faces of the container 10, the upper and lower walls 12 and 13 are the upper and lower wall of the container 10, and a platform 131 is positioned at the center of the inner wall face of the lower wall face 13.

The optical system 30 comprises a linear polarization polarizer 31, a LC panel 32, a light synthesizer prism 33 and a light examining polarizer 34. The linear polarization polarizer 31 is attached to the transparent wall 11 of the container 10, and the LC panel .32, light synthesizer prism 33 and light examining polarizer are all positioned in the transparent wall face 11 of the container 10, the light synthesizer prism 33 is disposed at the platform 131 of the lower wall face 13 of the container 10, and the light examining polarizer 34 is attached on the light synthesizer prism 33 and is corresponding to the LC panel 32.

The heat dissipation system 40 comprises heat pipes 41, heat radiating fins 42. The heat tubes are disposed over the LC panel 32, and pure water or alcohol is filled therein, the heat is carried away through the phase change of the fluid inside it, the heat radiating fins are disposed on the outer wall face of the upper wall face 12.

After the light route leads red, blue and green color lights respectively into the linear polarization polarizers 31 at the three flank sides of the container 10, the light passed through the transmitting zone 211 of the inlet flow guiding plate 21, the LC panel 32, the transmitting zone 211 of the exit flow guiding plate 22 and the light examining polarizer 34 via the transparent wall 11 of the container 10, then three color lights are synthesized through the light synthesizer prism 33. The synthesized light emits from the flank side of the light synthesizer that is installed without a light examining polarizer, and enters lens to project the synthesized image onto a screen.

When three color lights are passing through the LC panel 32, the light examining polarizer 34 and light synthesizer prism 33, the LC panel 32 and light examining polarizer 34 absorb part of light and the temperature is raised. Because the coolant will carry the heat of both away, thereby, the coolant with high temperature will flow upwards, and the heat carried by the coolant will be absorbed so as to lower the temperature of the coolant, and at that time, the coolant will flow downwards due to the gravity of itself and absorbs the heat of the both again. After the heat pipe 41 absorbs the heat of the coolant, the heat is conducted to the heat radiating fins 42 to dissipate the heat outside the container 10.

According to the cooling device of liquid crystal projector disclosed by the present invention, the efficacies can be achieved are as following:

1. It cools down the temperature of the LC panel so as to prevent the temperature of the LC panel from being too high to maintain its life, to display clear images on the screen and to maintain light modulation ability.
2. It cools down the temperature of the LC panel so as to prevent the inverse difference displayed on the screen from reducing.
3. It has a small size, so that it is very light and convenient, and easy for a user to carry.
4. It has a small size, so that it can be used in the mini-type and high illumination LC projector.

It is to be understood that the drawing is designed for purpose of illustration only, and is not intended for use as a definition of the limits and scope of the invention disclosed.

What is claimed is:

1. A cooling device of liquid crystal projector, comprising: a container, having a upper wall, a lower wall and a front and rear wall enabling light to penetrate through it, and transmitting fluid is filled in said container, the front side of said upper wall, connecting with said front wall face, having a plurality of grooves separated by a plurality of protruding parts, and a place of said lower wall corresponding to the front side of said upper wall having a plurality of grooves separated by said protruding parts;
   a flow guiding system, disposed in said container, comprising an inlet flow guiding plate and exit flow guiding plate at the front side of said wall face;
   a optical system, disposed in said container, comprising a liquid crystal panel, a light synthesizer prism and a light examining polarizer, wherein said liquid crystal panel is disposed between said inlet flow guiding plate and exit flow guiding plate, said light synthesizer prism is disposed at a proper place of said container, and said examining polarizer is disposed between said exit flow guiding plate and light synthesizer prism; and
   a heat dissipation system, disposed in said container, comprising a plurality of heat pipes disposed at the two flank sides of said liquid crystal panel, and one end of said heat pipe being disposed at a heat dissipating unit outside said container, and another end being disposed at a heat absorbing unit inside said container.

2. The device of claim 1, wherein said upper wall face comprises a plurality of grooves disposed outside said upper wall face.

3. The device of claim 1, wherein said lower wall face comprises a platform disposed inside said lower wall face.

4. The device of claim 1, wherein said flow guiding system further comprises a plurality of stirrers in said grooves.

5. The device of claim 1, wherein said optical system further comprises a linear polarization polarizer disposed outside the front wall of said container and corresponding to said liquid crystal panel.

6. The device of claim 1, wherein said heat dissipation system further comprises a plurality of heat radiating fins disposed outside said upper wall.

7. A cooling device of liquid crystal projector, comprising:
   a container, having a upper wall, a lower wall and a plurality of wall at four sides enabling light to penetrate through them, and a plurality of sides of said upper wall having a plurality of grooves separated by a plurality of protruding parts, and a place of said lower wall corresponding to the front side of said upper wall face having a plurality of grooves separated by said protruding parts;
   a flow guiding system, disposed in said container, comprising an inlet flow guiding plate and exit flow guiding plate at the front side of said wall face;
   a optical system, disposed in said container, comprising liquid crystal panels, a light synthesizer prism and a light examining polarizers, wherein said liquid crystal panels are disposed between said inlet flow guiding plate and exit flow guiding plate, said light synthesizer prism is disposed at a proper place of said container, and said examining polarizers are disposed between said exit flow guiding plate and light synthesizer prism; and
   a heat dissipation system, disposed in said container, comprising a plurality of heat pipes disposed at the two flank sides of said liquid crystal panel, and one end of said heat pipe being disposed at a heat dissipating unit outside said container, and another end being disposed at a heat absorbing unit inside said container.

8. The device of claim 7, wherein said upper wall comprises a plurality of grooves disposed outside said upper wall.

9. The device of claim 7, wherein said lower wall face comprises a platform disposed inside said lower wall face.

10. The device of claim 7, wherein said flow guiding system further comprises a plurality of stirrers in said grooves.

11. The device of claim 7, wherein said optical system further comprises linear polarization polarizers disposed outside the front wall face of said container and corresponding to said liquid crystal panel.

12. The device of claim 7, wherein said heat dissipation system further comprises a plurality of heat radiating fins disposed outside said upper wall.

13. A cooling device of liquid crystal projector, comprising:
- a container, having an upper wall, a lower wall and a plurality of walls at four sides enabling light to penetrate through them;
- a flow guiding system, disposed in said container, comprising an inlet flow guiding plate and exit flow guiding plate at the front side of said wall face;
- a optical system, disposed in said container, comprising liquid crystal panels, a light synthesizer prism and a light examining polarizers, wherein said liquid crystal panels are disposed between said inlet flow guiding plate and exit flow guiding plate, said light synthesizer prism is disposed at a proper place of said container, and said examining polarizers are disposed between said exit flow guiding plate and light synthesizer prism; and
- a heat dissipation system, disposed in said container, comprising a plurality of heat pipes disposed at the upper side of said liquid crystal panel.

14. The device of claim 13, wherein said upper wall comprises a plurality of grooves disposed outside said upper wall.

15. The device of claim 13, wherein said lower wall comprises a platform disposed inside said lower wall.

16. The device of claim 13, wherein said optical system further comprises a linear polarization polarizer disposed outside the front wall face of said container and corresponding to said liquid crystal panel.

17. The device of claim 13, wherein said heat dissipation system further comprises a plurality of heat radiating fins disposed outside said upper wall.

* * * * *